United States Patent [19]

Blakely, III et al.

[11] Patent Number: 5,838,903
[45] Date of Patent: Nov. 17, 1998

[54] CONFIGURABLE PASSWORD INTEGRITY SERVERS FOR USE IN A SHARED RESOURCE ENVIRONMENT

[75] Inventors: George Robert Blakely, III; Ivan Matthew Milman; Wayne Dube Sigler, all of Austin, Tex.

[73] Assignee: International Business Machines Corporation, Armonk, N.Y.

[21] Appl. No.: 556,724

[22] Filed: Nov. 13, 1995

[51] Int. Cl.⁶ .................................................. G06F 12/14
[52] U.S. Cl. ............................... 395/188.01; 395/200.5; 395/187.01
[58] Field of Search .................................... 380/23, 20, 48; 395/200.1, 200.6, 200.5, 200.01, 186, 188.01, 187.01

[56] References Cited

U.S. PATENT DOCUMENTS

| | | |
|---|---|---|
| 4,386,233 | 5/1983 | Smid et al. . |
| 4,694,492 | 9/1987 | Wirstrom et al. . |
| 5,060,263 | 10/1991 | Bosen et al. ............................... 380/25 |
| 5,241,594 | 8/1993 | Kung . |
| 5,241,599 | 8/1993 | Bellovin et al. . |
| 5,329,619 | 7/1994 | Pagé et al. . |
| 5,335,281 | 8/1994 | Tugenberg et al. ........................ 380/48 |
| 5,351,295 | 9/1994 | Perlman et al. . |
| 5,369,707 | 11/1994 | Follendore, III . |
| 5,444,850 | 8/1995 | Chang .................................. 395/200.1 |
| 5,491,752 | 2/1996 | Kaufman et al. .......................... 380/30 |
| 5,497,421 | 3/1996 | Kaufman et al. .......................... 380/23 |
| 5,604,490 | 2/1997 | Blakley, III et al. .............. 340/825.31 |
| 5,611,048 | 3/1997 | Jacobs et al. ....................... 395/187.01 |
| 5,655,077 | 8/1997 | Jones et al. ......................... 395/187.01 |

Primary Examiner—Parshotam S. Lall
Assistant Examiner—Zarni Maung
Attorney, Agent, or Firm—Jeffrey S. LaBaw; Brian F. Russell; Andrew J. Dillon

[57] ABSTRACT

A network system server that provides password composition checking for a plurality of clients is disclosed. The network system server includes a main data store, a security server, which is coupled to the main data store and the plurality of clients, a password synchronization server, which is coupled to the security server, a plurality of password strength servers, each of which is coupled to the password synchronization server, that provides password integrity among the plurality of clients so that each client maintains a password whose composition is consistent with the network server system. Each of the password strength servers is uniquely programmable with respect to performing password composition checking.

18 Claims, 12 Drawing Sheets

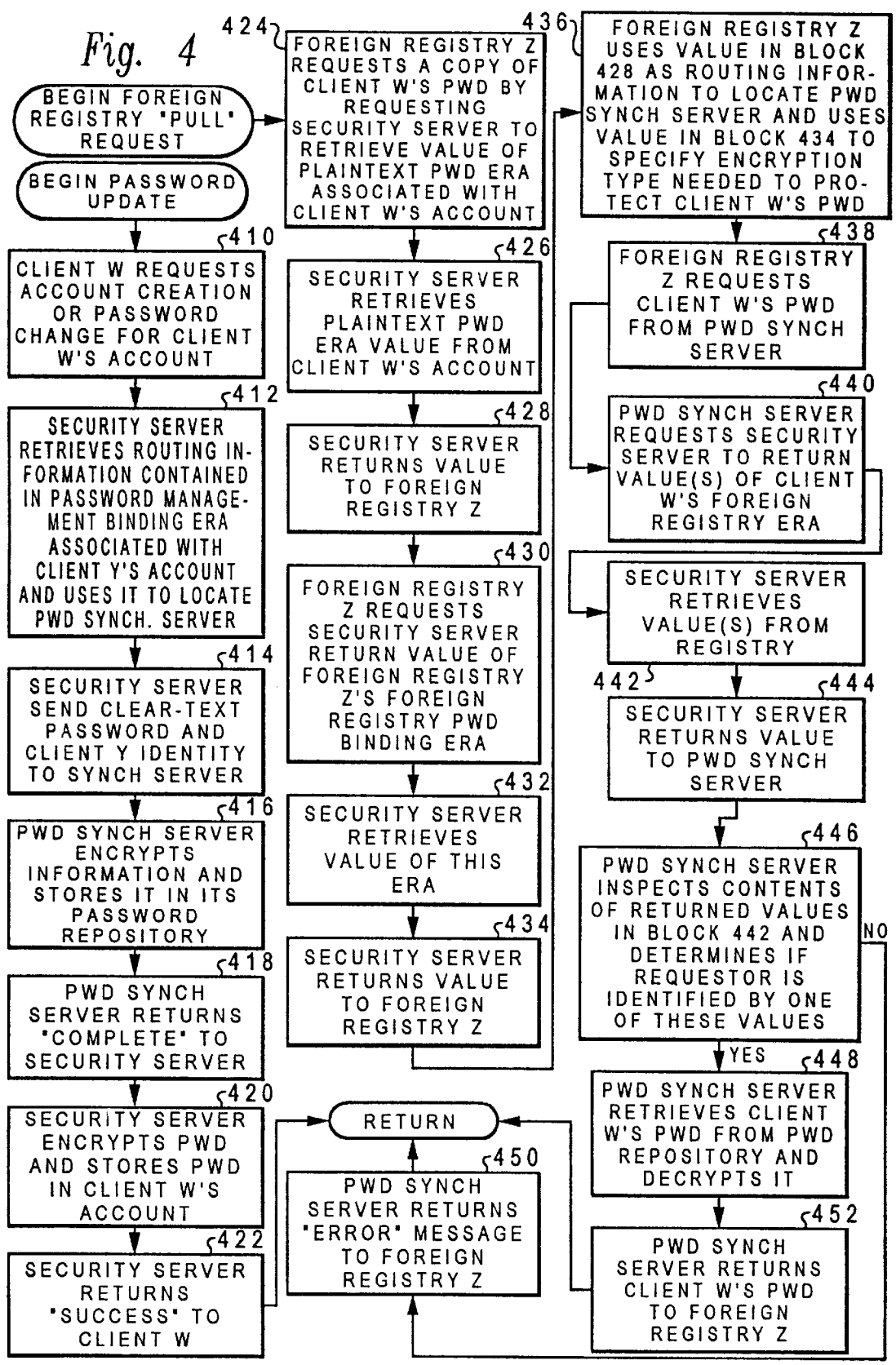

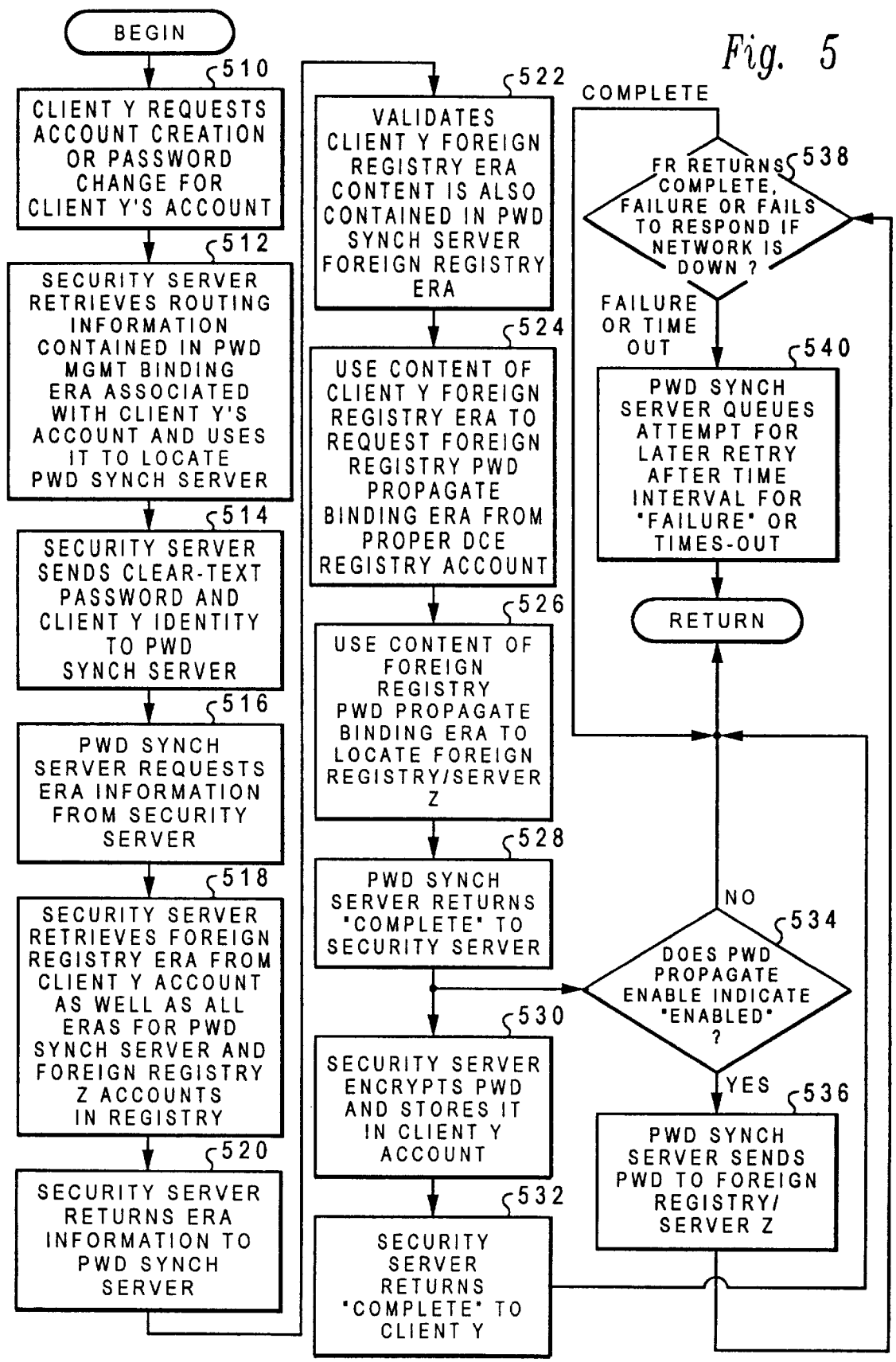

CONFIGURABLE PASSWORD INTEGRITY SERVERS FOR USE IN A SHARED RESOURCE ENVIRONMENT

CROSS-REFERENCE TO RELATES APPLICATIONS

The present application is related to U.S. patent application Ser. No. 08/557,755, filed Nov. 13, 1995, entitled "Propagating Plain-Text Passwords From a Main Registry to a Plurality of Foreign Registries," and U.S. patent application Ser. No. 08/557,754, filed Nov. 13, 1995, entitled "Retrieving Plain-Text Passwords From a Main Registry by a Plurality of Foreign Registries," all filed of even date herewith by the inventors hereof and assigned to the assignee herein, and incorporated by reference herein.

BACKGROUND OF THE INVENTION

1. Technical Field

This invention relates generally to data processing systems and, more particularly, to password maintenance among data processing systems with password synchronization. More specifically still, the present invention relates to providing password synchronization and integrity between a general repository and a plurality of users within a client/server system.

2. Description of the Related Art

Computer networks are well known in the arts and continue to grow in both size and complexity. This growth is fueled by more computers being connected to networks and connecting networks to other networks. This is done in order to enable computers to work together efficiently, to simplify sharing resources such as files, applications, printers, and even special computers.

Unfortunately, many networks contain computers from different manufacturers, which complicates the task of getting computers to work together efficiently. Computers in such "multi-vendor" networks are usually difficult to operate together because they do not use common data formats or common security mechanisms. The lack of a common network naming scheme also limits the degree to which computers can share information.

In order to overcome many of the above problems, the Open System Foundations ("OSF") Group has been formed that has developed the Distributed Computing Environment ("DCE") that transforms a group of networked computers into a single, coherent computing engine. DCE masks differences among different kinds of computers, thereby enabling users to develop and execute distributed applications that can tap into a network's latent power, using widespread resources such as storage devices, CPU's, and memory. Because distributed parts of these applications can execute concurrently, they can be much more powerful than single processor applications that must act on data sequentially.

Unfortunately, even distributed computing environments have their own problems such as how to protect data that must be shared among multiple users. Additionally, events must be synchronized between separate computers and computers with differing data formats and file-naming schemes must be allowed to work cooperatively one with another. DCE overcomes many of these problems and provide solutions to these vexing issues.

DCE is well known in the industry, an example of such is shown in FIG. 1. FIG. 1 is a block diagram of DCE application programming interface 1 that provides for a DCE file service 3. DCE is a layer of software that masks differences between various kinds of hosts. As a layer, it sits on top of a host operating system 5 and networking services for network transport 7. The DCE distributed services, which include security 9, directory 11, and time 13, remote procedure call ("RPC") 15 and thread services 17. RPC 15 and threads 17 are base DCE services that are available on every system on which DCE is installed. FIG. 1 further shows how the DCE file service is similar to an application that uses the underlying DCE services for distribution. DCE directory service further consists of a cell directory service 19 ("CDS") and a global directory service ("GDS") 21, which programs use by calling the directory service ("XDS") application programming interface ("API").

Typically, each user must first prove his or her identity by using a secret password to log onto the local host. The local host uses the password, which is known only to the user and the local host, as proof that the user is who he or she claims to be. Once the user logs onto the local host, the host resources are usually protected further by means of permissions or privileges associated with each file. The permissions regulate whether a user can read, write or execute that file. The number of users on a single local host is typically small enough so that the host alone can manage all of the passwords and permission functions.

A distributed computing environment, on the other hand, might support thousands of users accessing files on any of hundreds or thousands of local hosts in the environment. Because it is impractical to maintain every DCE user's security information on every host in the environment, DCE serves security information from a centralized database. This database, along with a distributed set of daemons and libraries, compose the DCE security service.

When servers enforce security, each client must provide its user's identity and access rights. These are provided on the first RPC call, and sometimes in highly secure environments, on every RPC call. Because access to every DCE resource—directories, files, printers, and so on—is controlled by a server, the server's demands for authentication and authorization require comprehensive network security. This applies to DCE servers, such as those of the CDS, as well as user application servers. The server verifies the clients' authenticity and authorization before allowing access to the resource.

Typically, security service functions are built into applications. This means that the clients call local security routines to request authentication information from a security server and pass it to other servers. Servers also call security routines to verify authentication information and enforce authorization. Authentication is the ability to prove one's identity to someone else. Authorization is the ability to regulate access based on one's identity. Passwords are used to ensure authenticity and then to gain authorization.

In DCE, the security service, which is also known as a registry, serves as a single source of security and manages information about users, groups, and the like. This gives a company a single place to define and manage users. One limitation to this approach is the propagation of passwords. Most registries only store an encrypted version of the user's password. Often, though, the encryption mechanism at each registry is different than any of the other registries, especially in a system where dissimilar registries from different vendors are being used. Thus, a password encrypted by the DCE registry may be unusable by another registry manufactured by someone other than the vendor of the DCE main registry. Accordingly, it would be beneficial to be able to propagate the plain text password securely from the DCE registry to registries that synchronize with the DCE registry so that other registries can then encrypt the password in their own format. This would allow a user to avoid having multiple passwords, typically one for security registry, and avoid the necessity of updating these passwords manually in each registry to insure they are consistent across all security registries.

Further, the DCE registry does not provide a way of populating a new non-DCE or foreign registry that wishes to populate its database with users and passwords from the DCE registry. This is because the DCE itself typically only stores encrypted passwords and the new registry cannot obtain the plain text passwords it needs to populate its database until an update occurs to a given user's password. Accordingly, it would be beneficial to provide a system that overcomes the prior problem of not being able to propagate passwords to new registries until an update to a given user's password has occurred.

SUMMARY OF THE INVENTION

A network system server that provides password composition checking for a plurality of clients is disclosed. The network system server includes a main data store, a security server, which is coupled to the main data store and the plurality of clients, a password synchronization server, which is coupled to the security server, a plurality of password strength servers, each of which is coupled to the password synchronization server, that provides password integrity among the plurality of clients so that each client maintains a password whose composition is consistent with the network server system. Each of the password strength servers is uniquely programmable with respect to performing password composition checking.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 illustrates the password synchronization retrieve function;

FIG. 5 illustrates the password synchronization propagation function;

DETAILED DESCRIPTION OF PREFERRED EMBODIMENT

Figure 1:
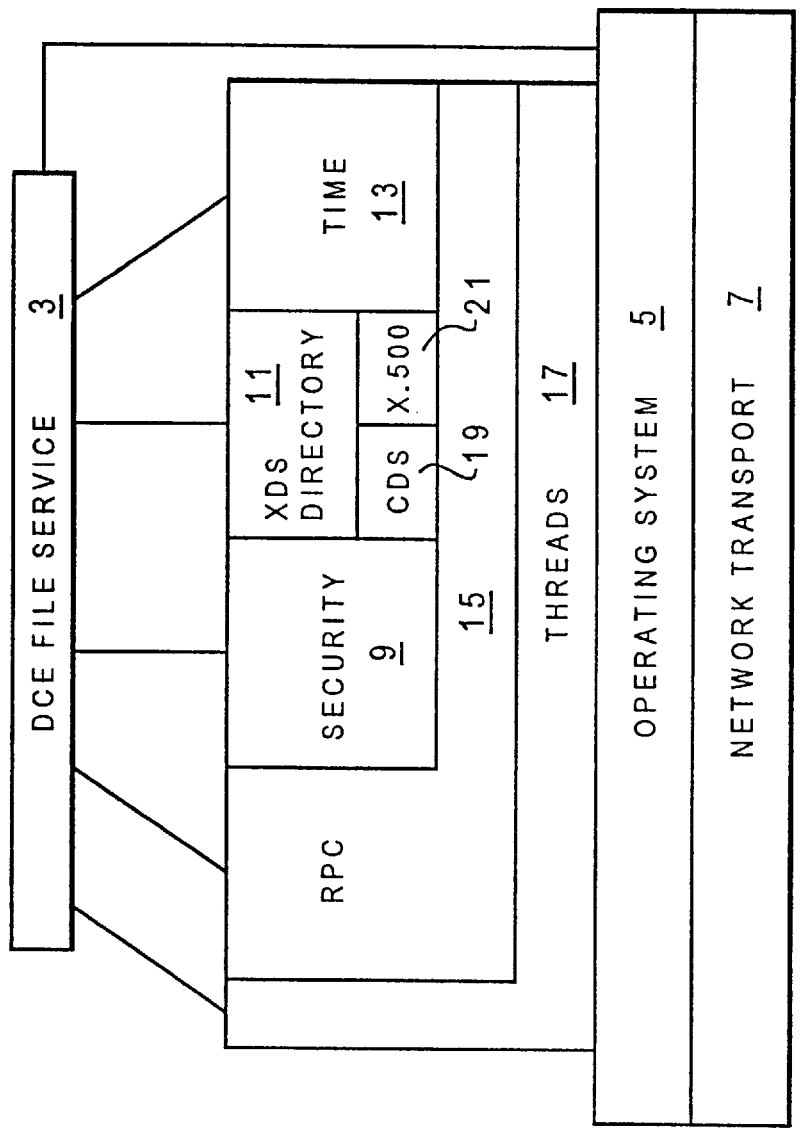
FIG. 1 is a block diagram of a prior art DCE security server.
Figure 2:
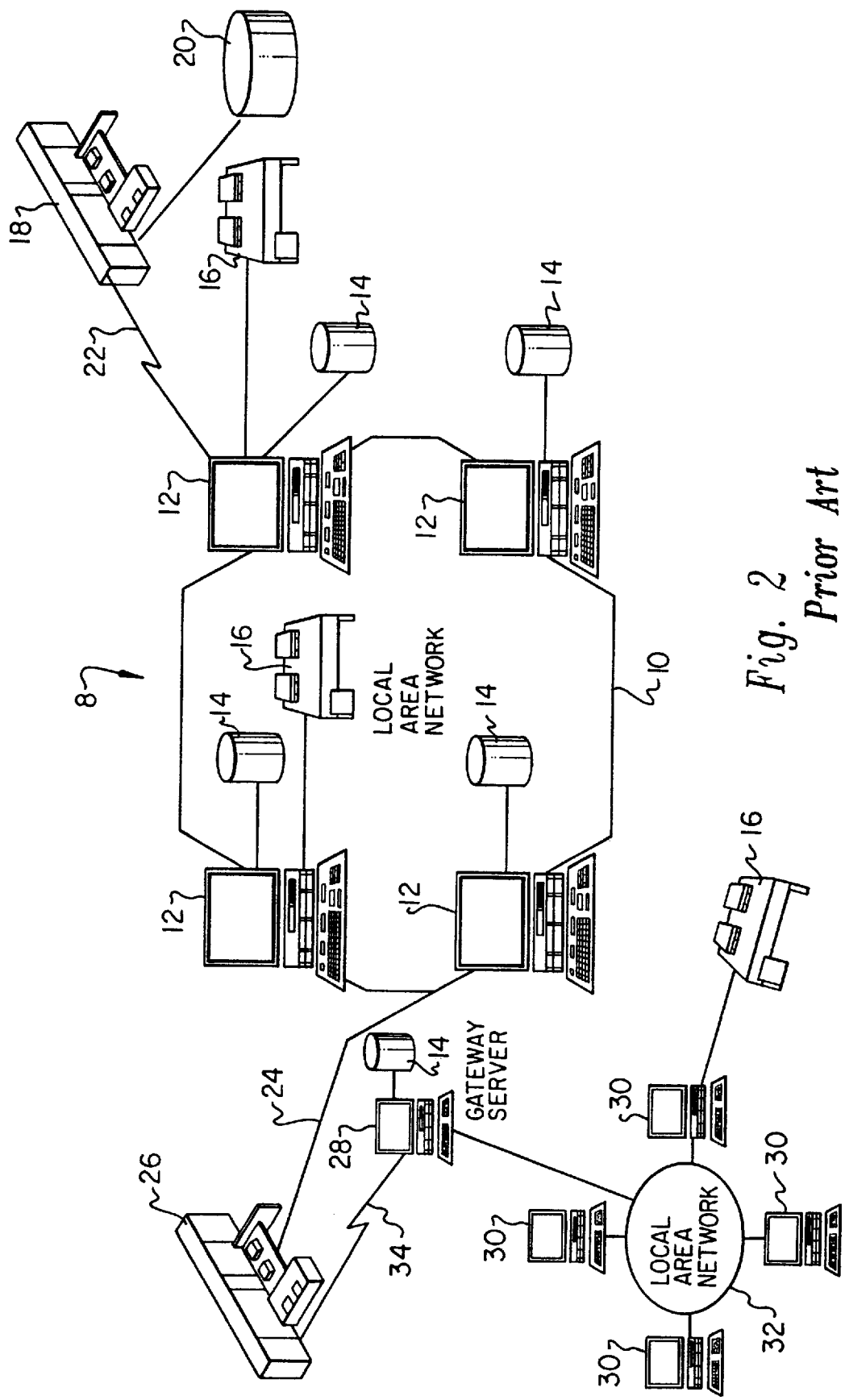
FIG. 2 depicts a pictorial representation of a distributed data processing system according to the present invention.

With reference now to the figures, and in particular with reference to FIG. 2, there is depicted a pictorial representation of a distributed data processing system 8 or distributed computing environment (DCE) system, which may be utilized to implement the method and system of the present invention. As may be seen, distributed data processing system 8 may include a plurality of local resource networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 2, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement a one-way access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 8 and periodically "locked" to prevent access by other users. It is the system administrator who typically controls access and performs modifications for security.

Open Systems Foundation (OSF) Distributed Computing Environment (DCE) 1.1 provides a facility called Extended Registry Attributes (ERA) that allows non-DCE registries to store attributes unique to these registries within the DCE Registry. This allows the DCE Registry service to be used as a centralized repository for security information related to all users in the enterprise, whether or not the registries are DCE registries. Although the embodiment presented below is described as a system that operates as a DCE system, it will be readily apparent to those skilled in the art that the present invention is not limited to a DCE implementation only, but is extendible to all distributed LANs that use a main or global system server that can accommodate foreign or remote registry servers. Accordingly, although DCE is used in its properly accepted definition, that definition is extended in this disclosure to mean extended LANs or WANs having a plurality of non-common remote servers attached to a main system server for allowing a user or plurality of users to maintain password synchronization across the non-common remote servers from their particular local host server.

The DCE system of FIG. 2 includes a mechanism for an enterprise to install a password strength checking server. Whenever the DCE registry receives a request to update a password, which includes the user account creation, the registry checks to see if password checking is enabled. If so, it sends the record, which includes the user name and the proposed new password, to the password strength server. The data is then forwarded in such a way that it is encrypted over the network, typically using one of the DCE's RPC, but the plain text password can be decrypted by the strength server. The strength server typically checks the password against the rules determined by the customer to insure that the password is not easily guessed. Such rules are well known in the arts and are left to the skilled artisan to implement. The password strength server then replies back to the registry service, informing it that the change is either acceptable or not acceptable. An example of a DCE synchronization and security system for use in the distributed processing system of FIG. 2 is illustrated in FIGS. 3A–3D.

Figure 3A:
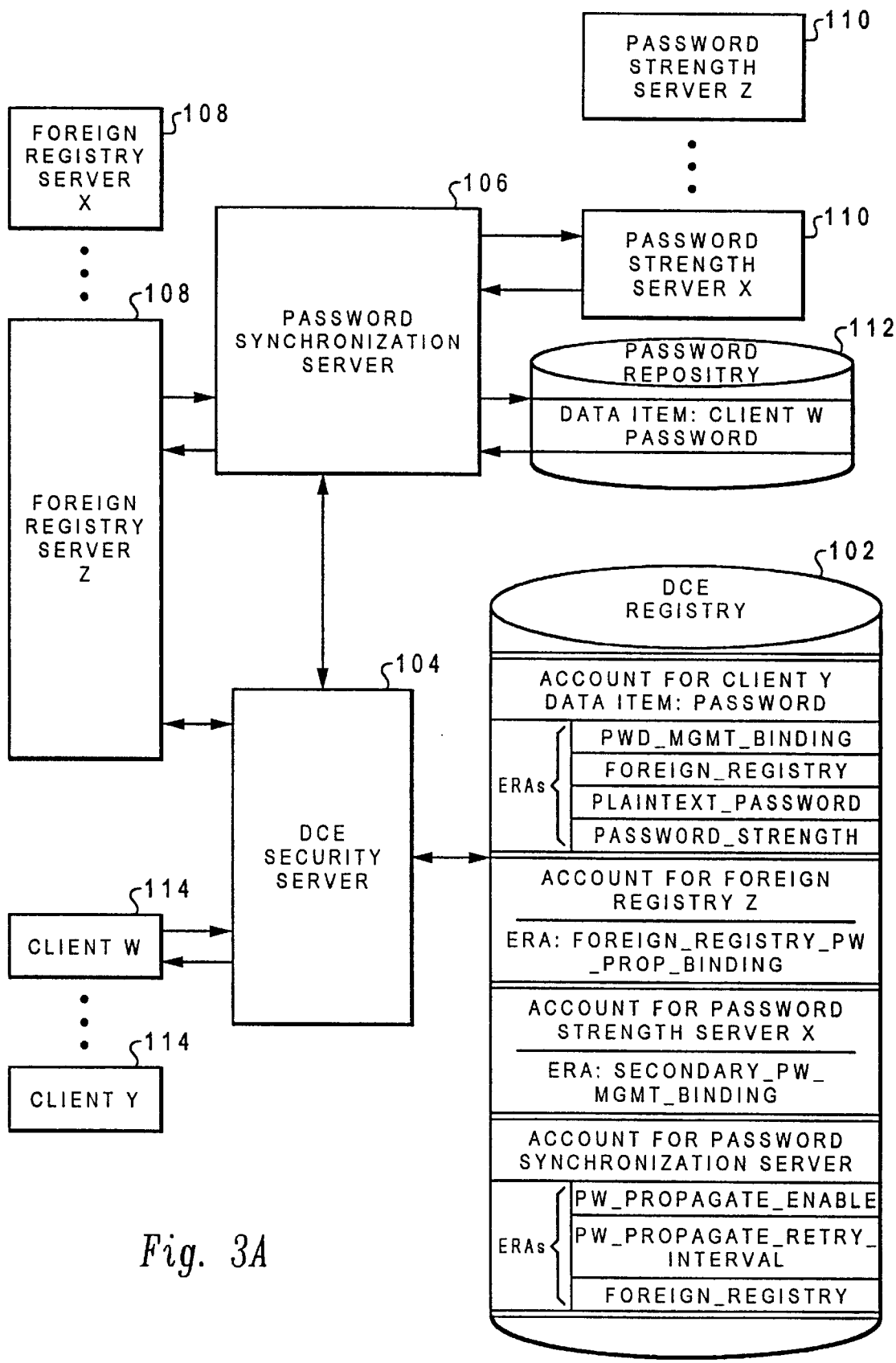
FIGS. 3A–3D illustrates an exemplary DCE synchronization and security system for use in the distributed processing system of FIG. 2.

For propagation of plain text passwords to other security registries that wish to be synchronized with DCE, a novel password synchronization server is now provided that securely propagates plain text passwords to these registries. A model of the DCE system with appropriate DCE registry and the novel password synchronization server is illustrated in the block diagram of FIG. 3A. In FIG. 3A, DCE registry 102 is coupled to a DCE security server 104, which in turn is coupled to a password synchronization server 106 and various foreign registry servers X–Z 108. Each foreign registry server 108 typically comprises a local server and a secondary data store used to maintain local information such as local passwords for one.

Password synchronization server 106 is further coupled to various local password strength servers X–Z 110 as well as to a password repository 112, which includes user names and associated passwords. DCE security server 104 is further coupled to each client W-Y 114.

Within DCE registry 102 there is an account for each client W-Y, in FIG. 3A only client Y is illustrated), but all clients are provided for in the DCE registry. Associated with each client Y are various ERAs such as password management binding, which allows the security server to locate the password synchronization server or password strength server for this client; foreign registry, which enumerates the foreign registries authorized to receive password propagations for this client; plain-text password, which allows a foreign registry to locate and request the plain text password from the password synchronization server; and password strength, which identifies the password strength server for this client. Additionally, accounts for each foreign registry 108 are also maintained within DCE registry 102. Although the example in FIG. 3A only depicts the account for foreign registry Z, all foreign registries from X–Z, or any number desired by a particular customer, are provided for in DCE registry 102. The account for each foreign registry includes the foreign registry password propagation binding ERA, which allows the password synchronization server to locate the foreign registry for purposes of password propagation.

Accounts for each password strength server 110 are also provided. Again, only one password strength server 110 is illustrated in FIG. 3A, but accounts for each of the password strength servers X–Z may be included. Each such account contains the secondary password management binding ERA, which is used by the password synchronization server to locate the password strength server for a given client.

Lastly, the DCE registry further includes an account for the password synchronization server 106 and comprises three ERAs. These three ERA's include password propagation enable, password propagation retry interval, and foreign registry. Each of these ERAs will be described in greater detail below.

Synchronization of passwords between the DCE registry and a foreign registry requires a solution that satisfies two requirements:

1) Provides a way for a foreign registry that has been configured into the network after the DCE registry has been populated with user definitions to acquire, on request, the passwords for selected users without the need to wait for those points in time at which the passwords will (may) be changed.

Meeting this requirement allows the foreign registry to generate initial user/password definitions in its local registry. This function is herein subsequently referred to as the "password synchronization pull" function.

2) Provides a way for a foreign registry to receive automatically password changes for selected users when these passwords are changed in the DCE registry. This function is herein subsequently referred to as the "password synchronization push" function.

Figure 3B:
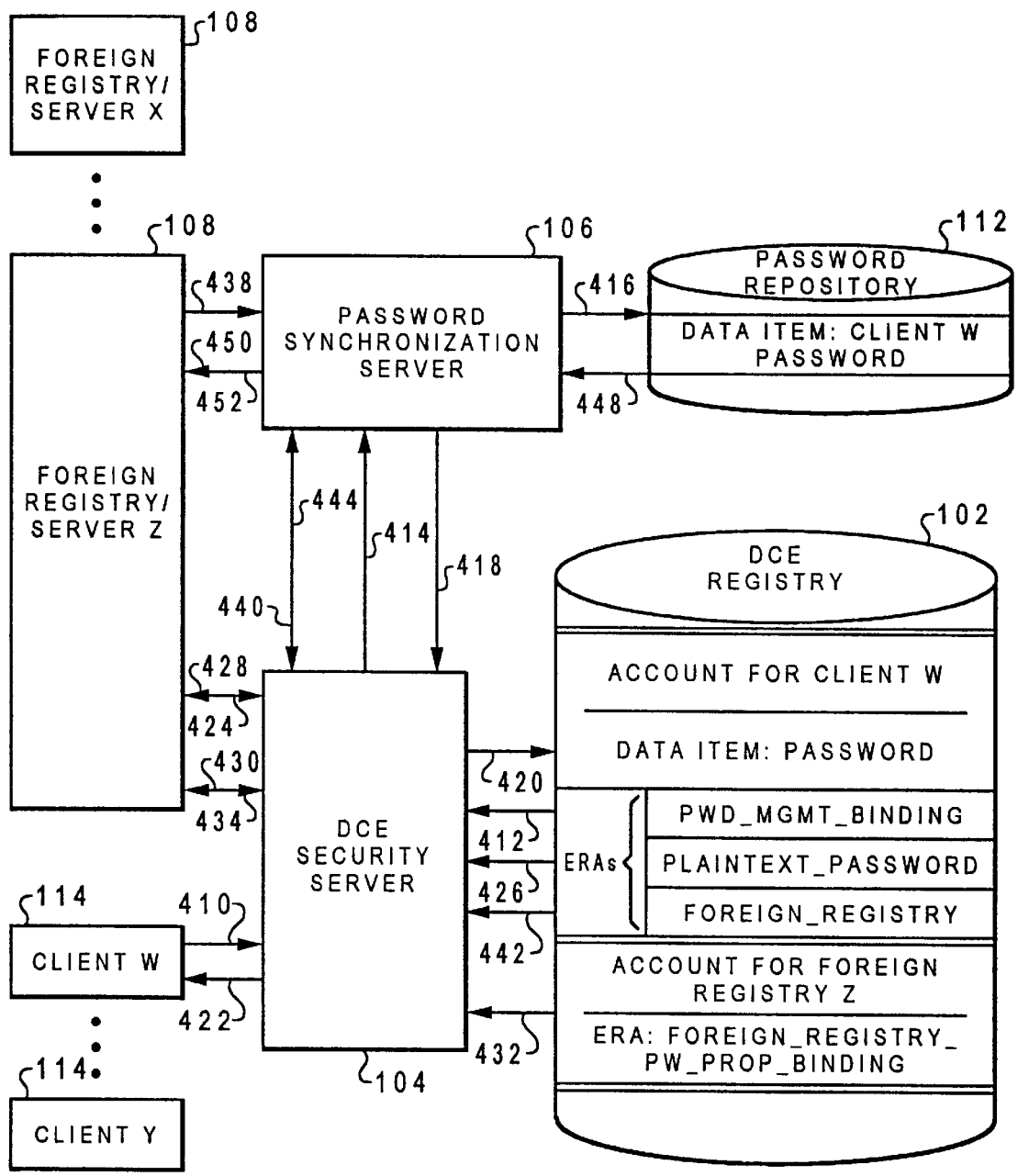

FIG. 4 illustrates the password synchronization pull function, a set of operations that service a foreign registry wishing to populate its own database with users and passwords from the DCE registry. Without this function, and because the DCE registry itself only stores encrypted passwords, the new registry cannot obtain the plain text passwords it needs to populate its database until an update occurs to a given user's password and this update is propagated to the new registry via the password synchronization push function described in FIG. 5. The flow diagram of FIG. 4 depicts a solution to this problem in that it modifies the password synchronization server of FIG. 3A, which is represented in FIG. 3B with respect to the elements used in the retrieval operation, so as to store user names and plain text passwords securely and to respond to requests for their retrieval. Support for this function requires the presence of a new data item for each affected user in the DCE registry. This data item is titled PLAINTEXT_PASSWORD and is a DCE extended registry attribute called, in DCE terminology, a "query trigger." Foreign registry attempts to read this ERA result in a query to the password synchronization server that subsequently returns the password for that user. It is noted that although DCE uses ERAs to associate password information with a user's account, any mechanism or security server that associates the user's password with the user's account can also be used. For example, the security server may have fields or use pointers for association.

A description of the operations represented in FIG. 4 follows. In block 410, a password update request is issued to DCE security server 104. In this case, client W requests account creation or password change for client W's account. In Block 412, DCE security server 104 upon the request retrieves the required routing information contained in the password management binding ERA associated with client Y's account and uses it to locate the password synchronization server 106. Next, in block 414, the security server 104 sends a clear text password and client Y identity to the password synchronization server 106. Afterwards, in block 416, password synchronization server 106 encrypts this information and stores it in its password repository 112. Afterwards, in block 418, the password synchronization server 106 returns a "complete" message to the security server 104.

The security server 104, in block 420 encrypts the password and stores it in the client W account within DCE registry 102. Afterwards, the security server returns a "success" message to client W (block 422).

At any time following the completion of the above steps, foreign registry Z 108 can request a copy of client W's password by requesting the security server to retrieve the value of the plain-text password ERA associated with client W's account as shown in block 424. In block 426, the security server retrieves the plain-text password ERA value from client W's account. Then, in block 428, the security server returns this value to foreign registry Z. In block 430, foreign registry Z requests the security server to return the value of foreign registry Z's foreign registry password propagate binding ERA. In block 432, the security server retrieves the value of the foreign registry password propagate binding ERA and then returns this value to foreign registry Z in block 434.

Foreign registry Z then uses the value returned in step 428 as routing information to locate the password synchronization server 106 as well as uses the value returned in step 434 to specify the type of encryption that will be used to protect client W's password while it is "on the wire" or being transmitted between the password synchronization server and foreign registry Z that occurs in a later step. Further, according to block 436, the foreign registry Z then requests client W's password from the password synchronization server 106. In block 438, the password synchronization server 106 requests the security server 104 to return the value(s) client W's foreign registry ERA. In block 440, the security server 104 retrieves this value(s) from DCE registry 102 and then returns the value(s) to the password synchronization server in block 442.

In block 444, the password synchronization server 104 inspects the contents of the return value(s) from block 442 to determine if the requester, which is foreign registry Z, is identical to one of these values. This is an access control check. If the value is not identified, the password synchronization server returns a "error" message in block 446. Otherwise, in block 448, if the value is identified, the password synchronization server retrieves client W's password from the password repository and decrypts it. Next, in block 450, the password synchronization server returns client W's password to foreign registry Z.

FIG. 5 illustrates the password synchronization push function, a set of operations that automatically propagate password changes for selected users (accounts) to one or more foreign registries requiring this data. Without this function, a change to the password(s) for accounts of interest would result in a different password value for the account as defined in the DCE registry and the value as defined in the foreign registries.

Figure 3C:
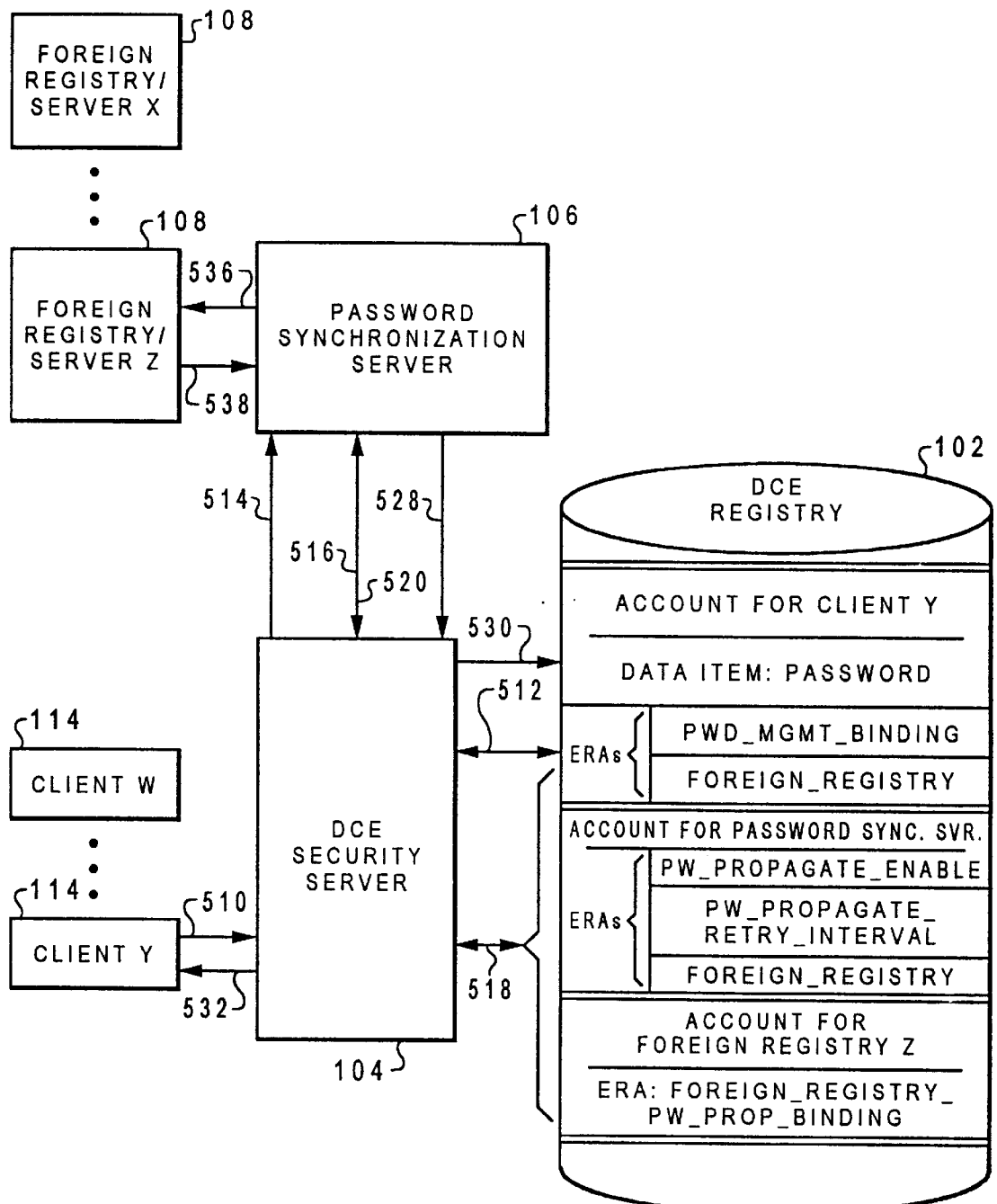

A description of the operations represented in FIG. 5 follows and is further represented by the server in FIG. 3C, which illustrates only the elements of the DCE synchronization and security system that are used in the synchronization push operation. Beginning in Block 510, the client of Y first requests account creation or a password change for client Y's account. In Block 512, the security server retrieves the routing information contained in the password management binding ERA associated with client Y's account and uses it to locate to the password synchronization server. In Block 514, the security server then sends the clear text password and client Y identity to the password synchronization server.

In Block 516, the password synchronization server then requests the DCE security server to provide ERA information including the foreign registry ERA for client Y from the client Y account as well as all ERAs for the password synchronization server and foreign registry Z accounts.

In Block 518, the security server retrieves the requested ERA information shown in DCE registry 102. In Block 520, the security server returns the ERA information to the password synchronization server, which then in Block 522 validates that client Y foreign registry ERA content is also contained in the password synchronization server's foreign registry ERA. This is a "access control" feature in that it prevents one not authorized to decide which foreign registries are authorized to receive password updates for client Y from causing changes to client Y's password to be propagated to unauthorized foreign registries. This is an effective access control check when, through the use of standard OSF DCE facilities, only a systems administrator or someone authorized to make such decisions is allowed to define the contents of the foreign registry ERA associated with the password synchronization server account.

In Block 524, the password synchronization server uses the content of the client Y foreign registry ERA to request the foreign registry password propagation binding ERA from the proper DCE registry account in DCE registry 102. For example, this is retrieved from the foreign registry Z account.

Upon completion of locating the foreign registries for each server X–Z, the system, in Block 528 and through the password synchronization server returns a "complete" message to the security server 104. In Block 530, the security server 104 encrypts the password and then stores it in the client Y account. Afterwards, in Block 532, the security server returns a "complete" message to client Y.

In Block 534, if the password propagate enable ERA indicates that it is "enabled," the password synchronization server, in block 536, sends the password to the foreign registry/server Z. Otherwise, the system returns. Next, in block 538, the foreign registry Z returns a synchronization complete status, failure status, or fails to respond if the network is down. If the signal is "complete," the system then returns; otherwise, the system proceeds to block 540. In block 540, if the password synchronization server receives failure status or times out awaiting a response, it re-queues this attempt for later retry after the time interval defined by the password propagate retry interval ERA has expired and then returns.

Native OSF DCE provides for the support of multiple password strength servers. When the DCE registry receives a request to define or change the password for a given user, it uses the password_mgmt_binding ERA associated with the requesting user to locate what it believes is a password strength server, sends the user identity and plain text password to that server, and then awaits a yes or no decision from the server. Design of the password synchronization function must not (and does not) require any change to the DCE security server, as this server may be implemented by various vendors on any platform supporting DCE. This invention cannot compel these vendors to make changes to their implementations of the security server and must therefore preserve the operation of this interface between the security server and what it believes to be a password strength server. Design of the password synchronization server takes advantage of this interface, substituting itself in the position of a password strength server, while not perturbing the security server's belief it is a password strength server. While this is an effective approach to acquiring the plain text password, thus enabling the password synchronization server to propagate it to foreign registries, it creates a problem when one desires, for the same account, to both propagate password changes and perform password strength checking. This is so because there is but one password_mgmt_binding ERA for a given account that is recognized by a native OSF Security server (and as just discussed, this invention cannot change security server behavior). Therefore, this one interface must support the functions of both password synchronization and password strength checking. Were it not necessary to preserve support for multiple password strength servers, each with its own customer-tailored set of composition rules, this constraint would not pose a significant problem. In this case, the password synchronization server 106 could, within its own processing steps, perform both propagation and strength checking. This not being the case, a different approach must be undertaken. Accordingly, in order to support customer-tailored password strength servers, password strength server 110 is added to interface with the password synchronization server 106.

With the addition of password strength server 110, the password synchronization server is able to route password change requests received from DCE registry 102 to the strength server 110. It then fields the password strength server's response, indicating password validity or invalidity, and returns the response to the DCE registry 102. Further, two new data items are required. The first is, for each user record in the DCE registry, a password strength ERA that must be created to contain the name of the password strength server that performs password composition checking for a given user. Also for each password strength server record in the DCE registry, a new data item, the secondary password management binding ERA is required. It contains information that allows the password synchronization server to locate the password strength server for a given user. In order to implement the use of the password strength server while also providing password synchronization among the foreign registries, the system implements the steps illustrated in FIG. 6.

Figure 3D:
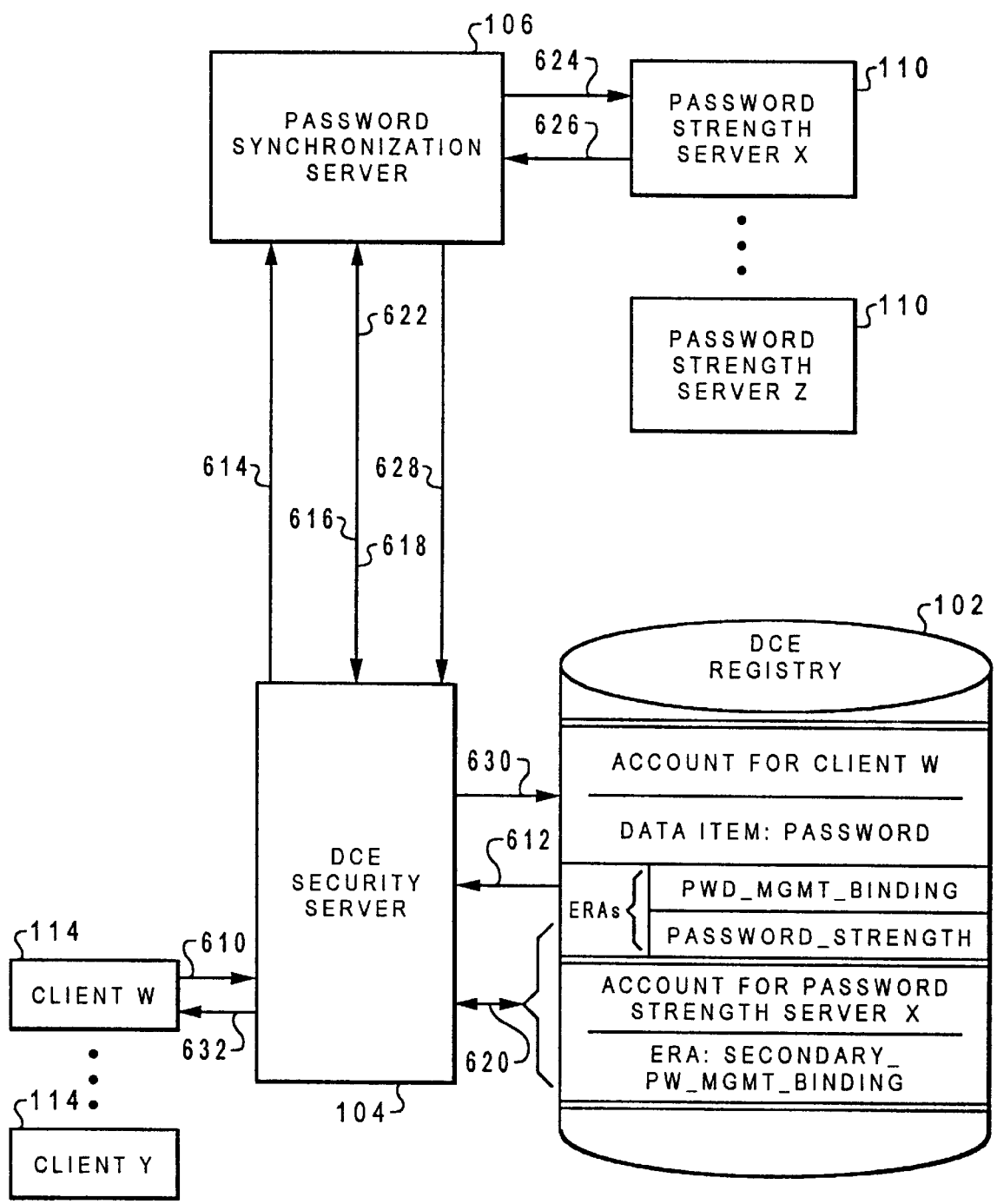
Figure 6:
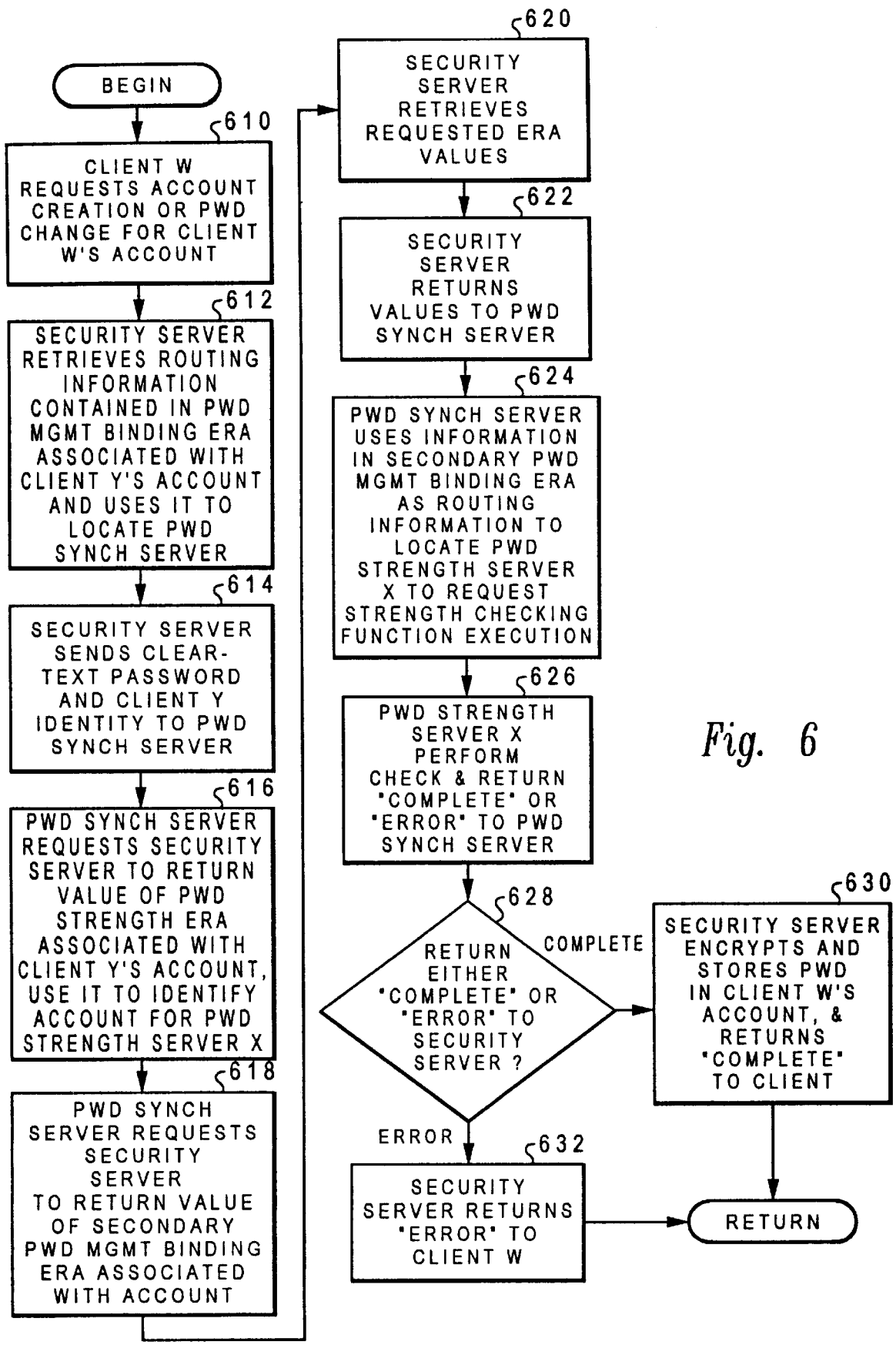
FIG. 6 depicts the steps that extend password synchronization to support password strength servers that may be customer-tailored according to a user's particular needs.

FIG. 6 depicts the steps that extend password synchronization to support password strength servers that may be customer-tailored according to a user's particular needs. Further, FIG. 3D illustrates only the elements of the DEC synchronization and security system utilized during strength checking. Note that, as in the native OSF implementation of password strength server support, only one password strength server can be associated with a given user, though different users may be configured to use different password strength servers. In block 610, client W 114 requests account creation or password change for the client W's account, which is similar to the first step in FIG. 5, block 510. Next, in block 612, the security server 104 retrieves the routing information contained in the password management binding ERA associated with the client Y's account and uses it to locate password synchronization server 106, which again is similar to that of block 512 in FIG. 5. In block 614, the security server sends a clear text password and client Y identity to the password synchronization server 106. In block 616, the password synchronization server requests the security server to return the value of the password strength ERA associated with the client Y's account and uses this value to identify the account for password strength server X110. The password synchronization server then requests in block 618 that the security server return the value of the secondary password management binding ERA associated with this account.

The security server 104 retrieves the requested ERA values and then returns these values to the password synchronization server in block 622. In block 624, the password synchronization server uses the information in the secondary password management binding as routing information to locate the password strength server X110 and requests this server perform its strength checking function.

In block 626, the password strength server X110 performs the strength checking function and then returns either a complete signal or an error signal to the password synchronization server. Then, in block 628, the password synchronization server returns the complete or error message of block 626 to the security server 104. In block 632, if an "error" message is noted, the security server returns the error message to client W 114. If the complete message is sent, the security server encrypts the password, stores it in client W's account in block 630, and returns "complete" to the client.

PASSWORD SYNCHRONIZATION SERVER REQUIREMENTS

The password synchronization function meets the following requirements. First, synchronization causes passwords changed by DCE users to be propagated as plain-text passwords to any other foreign registry configured to receive such changes. Propagation is immediate, with results saved for retry, as necessary, should communications with the foreign registries be broken. Retry propagation is subject to an administrator-controllable interval. This operation is referred to as "password synchronization push."

Second, the password synchronization server enables password synchronization without modifications to the DCE Registry code, such that any vendor's DCE 1.1 Security Server can be used to support the password synchronization functions.

Third, the password synchronization server preserves support for the password composition server (pwd_strength) function provided by OSF DCE 1.1, and allows password strength checking to occur independently of whether a user's password is to be synchronized.

Fourth, the password synchronization server supports plain-text password retrieval by a foreign registry upon foreign registry request. This operation is also called "password synchronization pull."

Fifth, the password synchronization server provides secure transmission of plain-text passwords parameters within the constraints imposed by client and server access to application data encryption functions.

Sixth, the password synchronization server provides fault-tolerance. If the password synchronization server goes down, this prevents passwords from being updated in DCE accounts of interest to foreign registries and thus precludes an out-of-sync condition. To cover the case in which the password synchronization server goes down before having emptied its in-memory propagation queues, disk-mirroring of the queues is employed. If a foreign registry is down while password changes are made, the password synchronization server maintains the required state information to be able to attempt propagation when/if the foreign registry comes back on line.

Seventh, in providing fault-tolerance (the sixth feature above), the password synchronization server recovers plain text passwords from disk storage. It protects these passwords while they are disk-resident by encrypting all plain-text password information into ciphertext format for disk storage.

Although the above requirements must be fulfilled in a DCE environment as heretofore disclosed, these requirements may be substantially modified, changed, or eliminated when implemented in a non-DCE server environment. In the non-DCE case, it is recommended that the requirements be followed, but the skilled artisan may deviate from these conditions as necessary in order to tailor the system according to the needs and desires of the users. For example, although password encryption is useful, it need not be implemented if the overall system is protected from hackers or other unwelcome guests.

The password synchronization server can be implemented in either a AIX or OS/2 platform, or any other type operating system platform implementing DCE, such as, for example, other UNIX-type or MVS platforms. Further, the system may be configured on a single DCE machine.

The absence of "over the wire encryption" protection of plain-text passwords between some nodes participating in password synchronization is accommodated. For example, lack of protection between two nodes can occur under either of the following conditions:

a participating node is an incompatible DCE node which does not support DCE Data Encryption Standard (DES) data privacy; or participating node is a DCE foreign registry that does support data privacy, and which is attempting a "pull" operation in a cell environment that includes at least one other DCE foreign registry that does not support data privacy. (I.e., all incompatible DCE foreign registries must be able to support data privacy if any of them is to be able to utilize such protection on password "pulls." This is so because compatible DCE foreign registries have access to an alternate data privacy encryption algorithm called Commercial Data Masking Facility (CDMF) which can be used by the password synchronization function to provide "over the wire encryption" in the absence of access to DES data privacy.

Of note, in the standard OSF implementation of password strength support, there is no "over the wire encryption" protection for plain-text passwords under the following circumstances:

a) either the security server or the password strength server is unable to support data privacy (occurs on normal composition check).

b) either a client or the password strength server is unable to support data privacy (occurs when the client attempts to request a password strength server-generated password).

All customer-provided strength servers that may potentially cohabit in a cell containing a password synchronization server must supplement a check made in the OSF DCE sample code, whereby a strength check API is rejected if the caller is not the "dce-rgy" principal, to accept the API if the caller is either "dce-rgy" or "pwsync." (These are the principals used by the security server and password synchronization servers when acting as a client to password strength servers.)

It is not necessary to preserve the ability for a strength server to know the real client identity on a "generate password" request, whenever such requests are actually relayed to it via the password synchronization server.

When a principal is configured for password synchronization, but not for password strength checking, the minimum set of registry policy checks on password composition (all blanks, at least one non-alphanumeric, minimum length) are not enforced.

All foreign registries configured for support by the password synchronization server must reside in the same DCE cell as the latter.

All foreign registries should verify that the client identity initiating any "password push" RPC is that of the password synchronization server (principal "pwsync"), to thwart any attacker's attempt to spoof the password synchronization server.

The password synchronization server cannot be replicated.

OVERVIEW OF OSF DCE 1.1 PASSWORD STRENGTH CHECKING

A review of the password strength checking mechanism in OSF DCE 1.1 is given to provide a foundation for understanding how password strength checking architecture can be leveraged to implement password synchronization.

By itself, the DCE security server provides a limited number of password composition rules. This includes minimum length, whether the password must contain at least one non-alphanumeric, and whether the password value can actually consist entirely of spaces. DCE 1.1 extends the capability of password composition checking by having the security server call out to a password strength-checking server whenever a password change request is received. This server also serves as a "password generator," and can be modified by customers to enforce any desired password composition rules.

The security server checks are not enforced if a strength server exists for a user; however, the behavior of the default (OSF-provided) strength server is to enforce these same checks. Strength servers can be written to ignore enforcement of such specific checks.

To support this new functionality, two new ERAs have been defined for password management in DCE 1.1:

0 PWD_MGMT_BINDING: This ERA attaches to a normal user principal and defines the strength server to be called by secd whenever an attempt is made to alter this user's password. This ERA is also used by a "change password program" client and defines the server to invoke to obtain a generated password. This ERA is of the "binding" encoding type, containing this information:

+service principal name of strength server
+CDS namespace entry where server exports bindings or contains a string binding instead
+RPC authentication levels to be used in communicating with the server.

An example of how this displays, using the dcecp convention, is:

```
{pwd_mgmt_binding {{dce pwd_strength pktprivacy secret name}/.:/subsys/dce/pwd_mgmt/pwd_strength}}
```

Password checking and password generation always take place in the same server, hence the need for only one ERA to define the location of this server.

0 PWD_VAL_TYPE: This ERA is also attached to normal user principals. It can take one of four values:
+NONE (0): If the ERA value is zero, or the ERA doesn't exist for the user principal, it means no strength checking is done, except for minimal default rules enforced by secd itself.
+USER_SELECT (1): This means that password strength checking is performed by the server named in PWD_MGMT_BINDING whenever secd receives a request to create or alter an account password.
+USER_CAN_SELECT (2): This means that any client program that prompts for a new password should first display a generated password obtained from the strength server named by PWD_MGMT_BINDING. The user is free to type this or something else as the password choice. Upon receipt of a request to change an account password, secd always invokes the strength server check. If the user types the generated password, the strength server algorithm treats the new password as if the user concocted it, and can potentially reject it. OSF DCE should fix this anomalous behavior to be consistent with behavior in the next case—when a generated password is typed by the user.
+GENERATION_REQUIRED (3): This means that any client program that prompts for a new password should first display a generated password obtained from a strength server named by PWD_MGMT_BINDING. The user is required to supply this password as confirmation. Subsequently, secd invokes the strength server check, which will succeed only if the strength server sees, within a cache it maintains, that the password had recently been supplied to this client as a generated one. The generated password is not subject to any other composition rules that apply to user-concocted values.

By necessity, a plain-text password is passed as either an input or an output parameter to the strength server. Rsec_pwd_mgmt_str_chk passes plain text as an input. Rsec_pwd_mgmt_gen_pwd returns plain-text as an output. Control of the degree of protection on the password is accomplished by the security server's use of the protection level specified as one of the parameters in the authentication portion of the PWD_MGMT_BINDING ERA. In the standard OSF DCE implementation, this level can only be set to packet privacy or packet integrity.

Part of the password synchronization implementation is a modification of OSF's DCE dcecp program and the corresponding underlying api to accept another protection level only supported by IBM DCE platforms, called "cdmf." Because the cdmf form of data privacy is freely exportable to foreign countries, generally including those that are unable to obtain a DES export license, IBM DCE support for the password strength and password synchronization functions provides a potential advantage over other vendors' implementations in that it will protect passwords on the wire in some circumstances where other implementations are unable to do so.

PASSWORD SYNCHRONIZATION OVERVIEW

The implementation of the password synchronization according to the present invention is now given. The system adds to or replaces the server that receives the callouts for password strength checking with a server that propagates passwords (a "push") to foreign registries instead. Before actually doing a "push," this server contacts the real strength server for password composition checking. In addition, this new password synchronization server fields requests to retrieve plain-text passwords (a "pull") from foreign registries for a specified user.

New and existing ERA definitions must be added or modified. The first two that follow are the existing ones, with a modified description of how they affect system behavior. The new ERAs then follow. See FIG. 3 for a pictorial representation of these ERAs and their associated principals.

0 PWD_MGMT_BINDING: Same behavior as before when attached to a user principal, except that for a user for which password synchronization is relevant, the information within this ERA will point to 'pwysnc,' and not a real strength server. Users for which strength checking is relevant, but not synchronization, have the ERA set to point directly to a strength server.

An instance of this ERA also is attached to the 'pwsync' principal itself. This serves as a convenient "template" that can be read by account administrative tools. I.e., the tool need not prompt for information necessary to have a new user participate in password synchronization; the data can be read from the value of this ERA as stored on the 'pwsync' principal.

0 PWD_VAL_TYPE: Same meanings as described above. Note that if 'pwsync' is the server pointed to by PWD_MGMT_BINDING, 'pwsync' does not re-read the PWD_VAL_TYPE era. Rather, it relies on the value passed to it as a result of the strength check RPC to in turn pass on such requests to the real strength server.

PWD_VAL_TYPE must be set to 1 or greater if any password synchronization is to occur for a user principal. PWD_VAL_TYPE should not exist, or have a value of zero, for service principals. This is particularly important for the 'pwsync' service principal, for which a "template" value of PWD_MGMT_BINDING exists.

0 FOREIGN_REGISTRY_PW_PROP_BINDING: This ERA is associated with the principal object for foreign registries. It contains binding and authentication information for use by the password sync server in propagating passwords to the foreign registry on a "push."

0 FOREIGN_REGISTRY: This multi-valued ERA is associated with a normal user's principal object. It contains one or more character strings, identifying the DCE server principal name(s) of a foreign registry(s). It thus represents a registry(s) to which changes in this user's password should be propagated. It is also used in a "pull" operation by the password synchronization service as an access control mechanism. This is accomplished by insuring that the DCE identity of the "pulling" program is one of the entries found in the FOREIGN_REGISTRY ERA attached to the user principal for which the request is made.

As can easily be seen, the FOREIGN_REGISTRY value serves as a "key" during a password propagation, directing the DCE software to the proper service principal from which to query the binding information as stored in the FOREIGN_REGISTRY_PW_PROP_BINDING era.

This multi-valued ERA is also stored on the pwsync principal, but its meaning is different than when attached to normal principals. It contains the values of all installed foreign registries. Tools that need to know the names of all foreign registries as candidates for attaching FOREIGN_REGISTRY ERAs on a new principal can obtain the candidate list by reading the value of FOREIGN_REGISTRY from the pwsync principal.

The PWSYNC facility also inspects FOREIGN_REGISTRY contents as attached to the "pwsync" principal, as an access control check on the legal values of FOREIGN_REGISTRY eras attached to user principals. Hence, the presence of FOREIGN_REGISTRY is mandatory, not optional.

- 0 SECONDARY_PWD_MGMT_BINDING: This ERA is associated with the principal object for a password strength server. It contains binding and authentication information for use by the password synchronization server in relaying requests for password generation and password checking. Since pwsync is the direct recipient of such requests because of the PWD_MGMT_BINDING contents, a "secondary" ERA is needed so that pwsync can route such requests to an actual generator/checker. Such callouts to strength servers occur before any attempt to propagate a new password to foreign registries.
- 0 PASSWORD_STRENGTH: This ERA is associated with a normal user's principal object. It contains a character string value, namely the DCE server principal name of a strength server. Thus, it denotes the strength server to be involved in any of this user's password changes.

As can easily be seen, the PASSWORD_STRENGTH value serves as a "key" during a password change, directing the password sync server to the proper service principal from which to query the binding information as stored in the SECONDARY_PWD_MGMT_BINDING era.

- 0 AVAILABLE_STRENGTH_SERVER: This multi-valued ERA is stored on the pwsync principal only. It contains the names of all installed strength servers. Tools that need to know the names of all strength servers as candidates for attaching a single-valued PASSWORD_STRENGTH era on a new principal can obtain the list of candidate servers by reading the value of AVAILABLE_STRENGTH_SERVER from the pwsync principal.

The PWSYNC facility also inspects AVAILABLE_STRENGTH_SERVER contents as attached to the "pwsync" principal, as a validity check on the legal values of PASSWORD_STRENGTH ERAs attached to user principals. Hence, the presence of AVAILABLE_STRENGTH_SERVER is mandatory, not optional.

- 0 PLAINTEXT_PASSWORD: This ERA is a query trigger associated with a normal user's principal object. Foreign registries will "pull" a recoverable plain-text password when needed by querying the value of this ERA. The request will be rerouted from secd to the password sync server, by virtue of the query trigger stored in the schema definition having binding and authentication information for pwsync.

There is no need to alter the schema permissions to restrict tightly who can read this sensitive ERA, because pwsync itself makes the validity check as to who can query such sensitive information as a function of the values of the FOREIGN_REGISTRY eras that attach to a user's principal. If the plain-text password is not known by pwsync, a NULL string will be returned as the password.

- 0 PW_PROPAGATE_ENABLE: This ERA is attached to the pwsync principal and contains a boolean true/false indication of whether password propagation is enabled. When disabled, propagation via "push" is disabled, but foreign registries may still "pull" passwords.
- 0 PW_PROPAGATE_RETRY_INTERVAL: This ERA is attached to the pwsync principal and contains a signed 32 bit integer value representing the interval (in seconds) at which passwords are propagated to foreign registries if their initial propagation had failed. A value of zero is illegal, and effectively inhibits retry propagation. The value of this ERA is moot if PW_PROPAGATE_ENABLE is marked to disable propagation altogether.

PASSWORD SYNCHRONIZATION IMPLEMENTATION

The basic structure of the password synchronization server consists of a main routine that performs setup tasks typical of DCE servers and then 'listens' for requests, a key management thread, an identity refresh thread, a Pull data base pruning thread, and routines for handling the RPC initiated as the result of a foreign registry reading the plain-text_password ERA associated with a given user, and the rsec_pwd_mgmt_str_chk RPC from the security server. The latter RPC, though, as implemented in pwsync is now basically a way-station. Rather than perform the actual core functionality itself, it now forwards the request to the password strength server in effect for the subject principal.

New functionality consists primarily of the functions that support "push" and "pull" operations requested by foreign registries wishing to maintain password synchronization with the DCE registry. rsec_pwd_mgmt_str_chk serves as the gateway to this new functionality, as it provides the means by which pwsync can get its hands on the new password data.

"Push" refers to the propagation of a user's plain-text DCE password to interested and authorized foreign registry servers whenever the password is changed in DCE. Such "pushes" do not occur as an integral part of the rsec_pwd_mgmt_str_chk processing, as one might initially suspect. Delaying the return to secd is undesirable from a human factors perspective.

Thus, the data is instead stored in an in-memory queue for later processing by separate propagation threads. (The first propagation attempt is immediate, with retries taking place at administrator-specified intervals.) Disk mirroring is used to prevent loss of data in the event of unexpected program termination. Such loss would otherwise result in out-of-sync conditions between the DCE and foreign registries. Note that when the password synchronization server's propagation thread performs a "push" operation, it is acting as a client of the foreign registry exporting the relevant "push" server interface (rsec_pwd_propagate).

"Pull" refers to the password synchronization server's role as trigger server with reference to the PLAINTEXT_PASSWORD extended registry attribute. Foreign registries' queries of the value of this attribute are routed by native OSF DCE function to pwsync for retrieval of the associated password. To accommodate this, pwsync exports the sec_attr_trig_query interface. Having plain-text passwords available "on demand" means that pwsync must maintain a permanent record of user names and their associated passwords. Although it is a given that in light of the sensitive functions it performs pwsync should reside on a highly secure machine, it is also clear that the passwords in this database must be afforded extra protection. Such protection is modeled after the DCE Security Server's master-key encryption of sensitive Registry data. (The same protection is afforded to passwords in the "push" database, although it is less crucial because the data there is expected to be short-lived.)

The Password Synchronization server consists of a single process with a main thread and five auxiliary threads. Flow diagrams detailing the processing steps for two of these threads and for the rsec_pwd_mgmt_str_chk RPC interface servicing calls from the security server follow.

1) Main Thread: Performs initialization functions required by all such DCE application servers, e.g., registers bindings and interfaces in the Cell Directory namespace, creates all auxiliary threads, "listens" on RPC interfaces to service calls from the security server and from foreign registry clients attempting to "pull" a password for a specific account.

2) Password Synchronization Server Identity Refresh Thread: Re-establishes this server's DCE identity by "logging in" as the server on a periodic basis. (standard practice and method for all DCE application servers).

3) Password Synchronization Server Key Refresh Thread: Changes the account password for this server on a periodic basis, which is well known in the practice and method for all DCE application servers.

4) Password Synchronization Server Pull RPC and Pull Data Base Pruning Thread: At initialization, the password synchronization server main thread initializes the Memory Pull Data Base from the Disk Pull Data Base and eliminates all entries for each user present that are superseded by another entry for the same user. When a Pull request is received on the RPC upon which the main thread is listening, the memory data base is searched for an entry for the requested user. If found, the contents of the foreign_registry ERAs associated with both the password synchronization server's and requested user's account are inspected to determine if the requesting foreign registry is defined in these ERAs. If so, the password for the requested user is returned on this RPC. If the password is not found or the inspection fails, an error is returned. The Pull Data Base Pruning thread operates on a timer to periodically prune the disk pull data base of all entries for each user present that are superseded by another entry for the same user.

5) Password Synchronization Server RPC from Security Server: When the main thread receives a call from the security server via this RPC, the processing steps depicted in FIG. 7 are performed.

6) Password Synchronization Server Propagation Queue Thread: When the password synchronization server sets Signal "P" (shown in FIG. 7), this thread is awakened to perform the processing steps depicted in FIG. 8.

7) Password Synchronization Server Retry Queue Thread: When the Propagation Queue thread sets Signal "R" (shown in FIG. 8), this thread is awakened to perform the processing steps depicted in FIG. 9.

Figure 7:
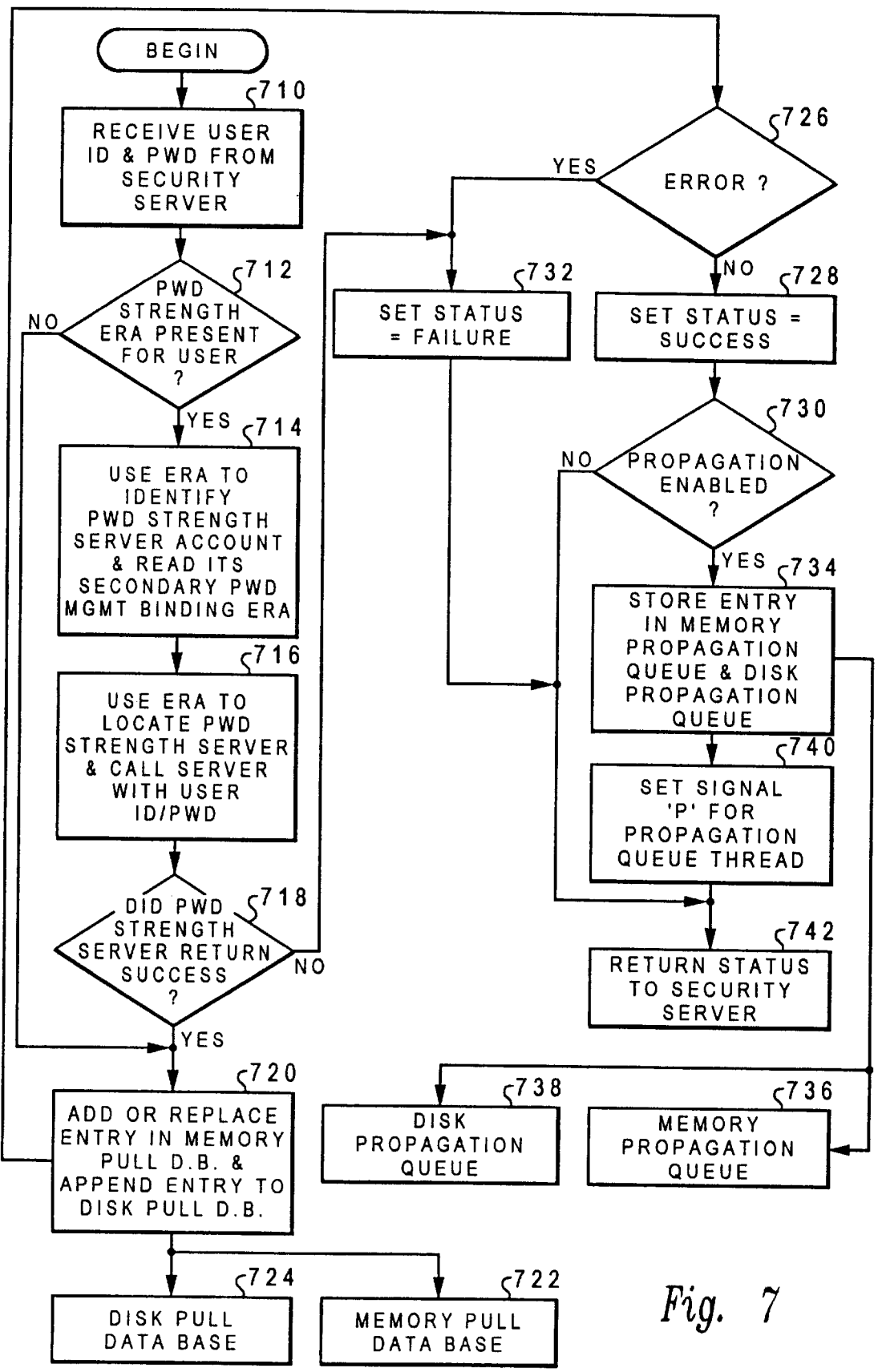
FIG. 7 depicts a flow chart of user password processing from the security server.
Figure 8:
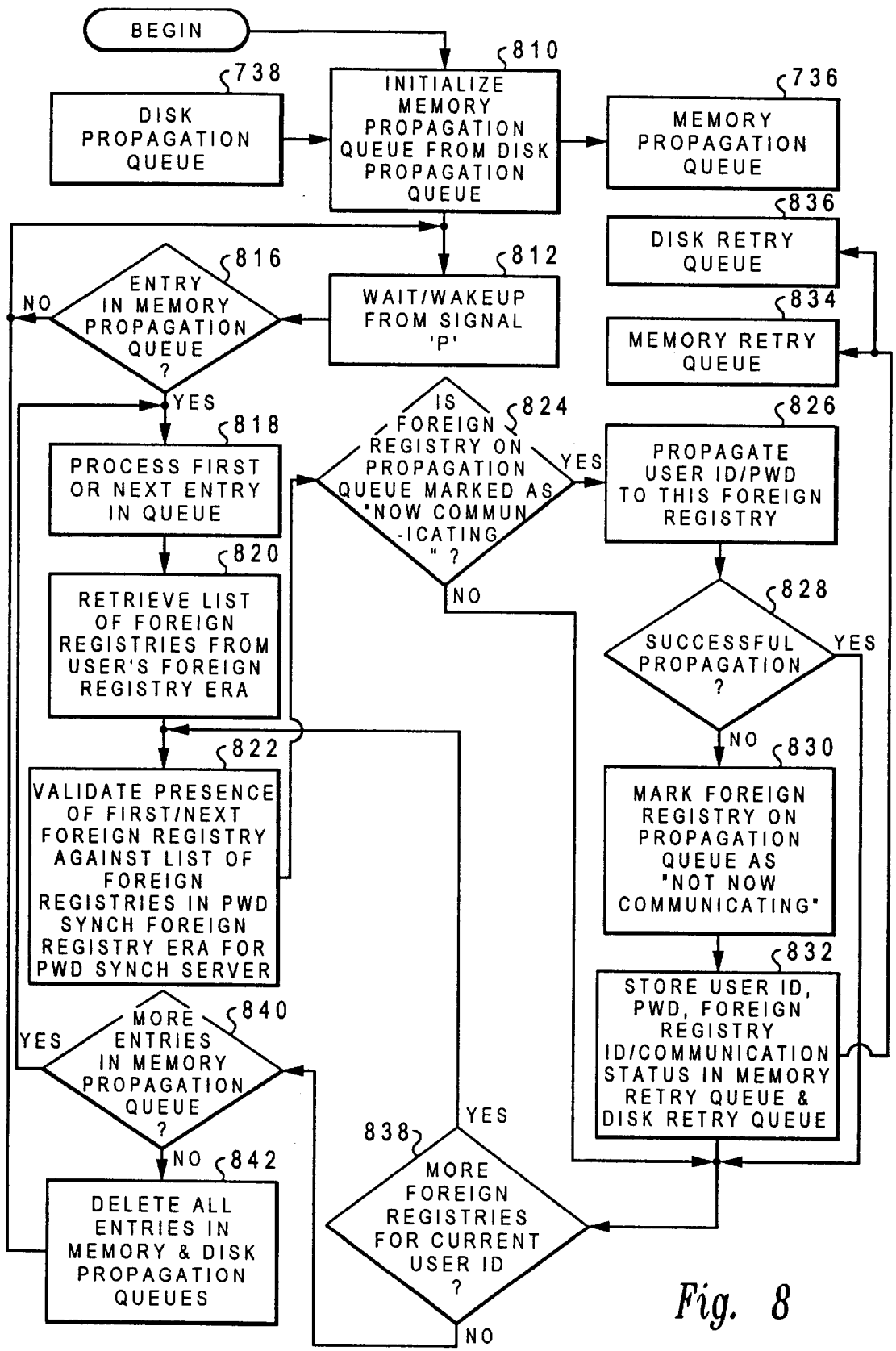
FIG. 8 illustrates the password synchronization server propagation queue thread.

FIG. 7 depicts a flow chart of user password processing from the security server. First, in block 710, the password synchronization server receives the user ID and password from the security server. Then, in block 712, the synchronization server determines if the password strength ERA is present for the user and if so proceeds to block 714; otherwise, the security synchronization server proceeds to block 720 described below. In block 714, the synchronization server uses the password strength ERA to identify the appropriate password strength server associated with the user and its account and then reads its secondary password management binding ERA. After completing block 714, the synchronization server proceeds to block 716 where the password strength server account and secondary management binding ERA are used to locate the password strength server and call the strength server with the user ID/password.

In block 718, the password strength server returns a message of whether its composition check was successful. If so, if the system proceeds to block 720; otherwise, the system proceeds to block 732 further described below. In block 720, the systems add or replaces the entry in the memory pull database and appends the entry to the disk pull database 112. The memory pull database is illustrated in block 722, while the disk pull database is illustrated in block 724. Next, in block 726, the system determines whether an error has occurred and if so, it proceeds to block 732; otherwise, if no error has occurred, the system proceeds to block 728 where the system sets the status message as being a "success." If an error has occurred or if the password strength server composition check failed, then, in block 732, the system sets the status message as "failure." If a failure has occurred, the system then proceeds to block 742, described below.

In block 730, a password strength server determines if a propagation has been enabled as a function of the value of the pw_propagate_enable ERA. If the propagation has been enabled, the system proceeds to block 734, otherwise, in the system proceeds to block 742 described below. In block 734, the strength server stores the entry in memory in the propagation queue and also in the disk propagation queue represented by blocks 736 and 738, respectively. The system then proceeds to block 740 where the strength server sets the signal "P" for propagation queue thread described above. Afterwards, and if the propagation enable had not been set in block 730, the system, in block 742, returns the status to the security server The password synchronization server propagation queue thread operates according to the steps illustrated in FIG. 8. The password synchronization server, in block 810, initialized a memory propagation queue from the disk propagation queue, which are block 736 and 738, respectively, as described in FIG. 7. Next, in block 812, the system waits for a wake-up signal from the signal "P" from FIG. 7, block 740. In block 816, the system then determines if an entry has been made in the memory propagation queue 736 and if not returns to block 812; otherwise, the system proceeds to block 818 where the synchronization server processes the first or next entry in queue 736. Next, in block 820, the system retrieves a list of foreign registries from the user's foreign registry ERA found in the user's account. Once the list has been retrieved, the system, in block 822, validates the presence of the first or next foreign registry against the list of foreign registries found in the foreign registry ERA for the password synchronization server. Once the validation has been completed, the particular foreign registry on the propagation queue 736 is then inspected to see if it is presently marked as "NOW COMMUNICATING" and if not, the system proceeds to block 840 described below; otherwise, the system proceeds to block 826.

In block 826, the system propagates the user ID/password to the requesting foreign registry of block 824 and then in block 828, determines whether the propagation has been successful and if so proceeds to block 838; otherwise, if the propagation is unsuccessful, the system proceeds to block 830. In block 830, the system marks at the particular foreign registry on the propagation queue as "NOT NOW COMMUNICATING." The system then proceeds to block 832 where the system stores the user's ID, password, foreign registry ID/communication status in the memory retry queue 834 and the disk retry queue 836.

In block 838, if the foreign registry in not now communicating or the propagation of block 828 had been successful, the system determines whether there are additional foreign registries for this particular user ID being processed and if so returns to block 822 et seq. Otherwise, if no more foreign registries are associated with this user ID, the system proceeds to block 849 where the system determines whether there are any more entries in memory propagation queue 736. If there are more entries in the memory propagation queue, the system returns to block 818 and the process starts over again for the next entry in the propagation queue; otherwise, the system proceeds to block 842, where the synchronization server deletes all entries in memory propagation queue 736 and disk propagation queue 738. Afterwards, the system then returns to block 812, awaiting the settling of signal 'P'.

Figure 9:
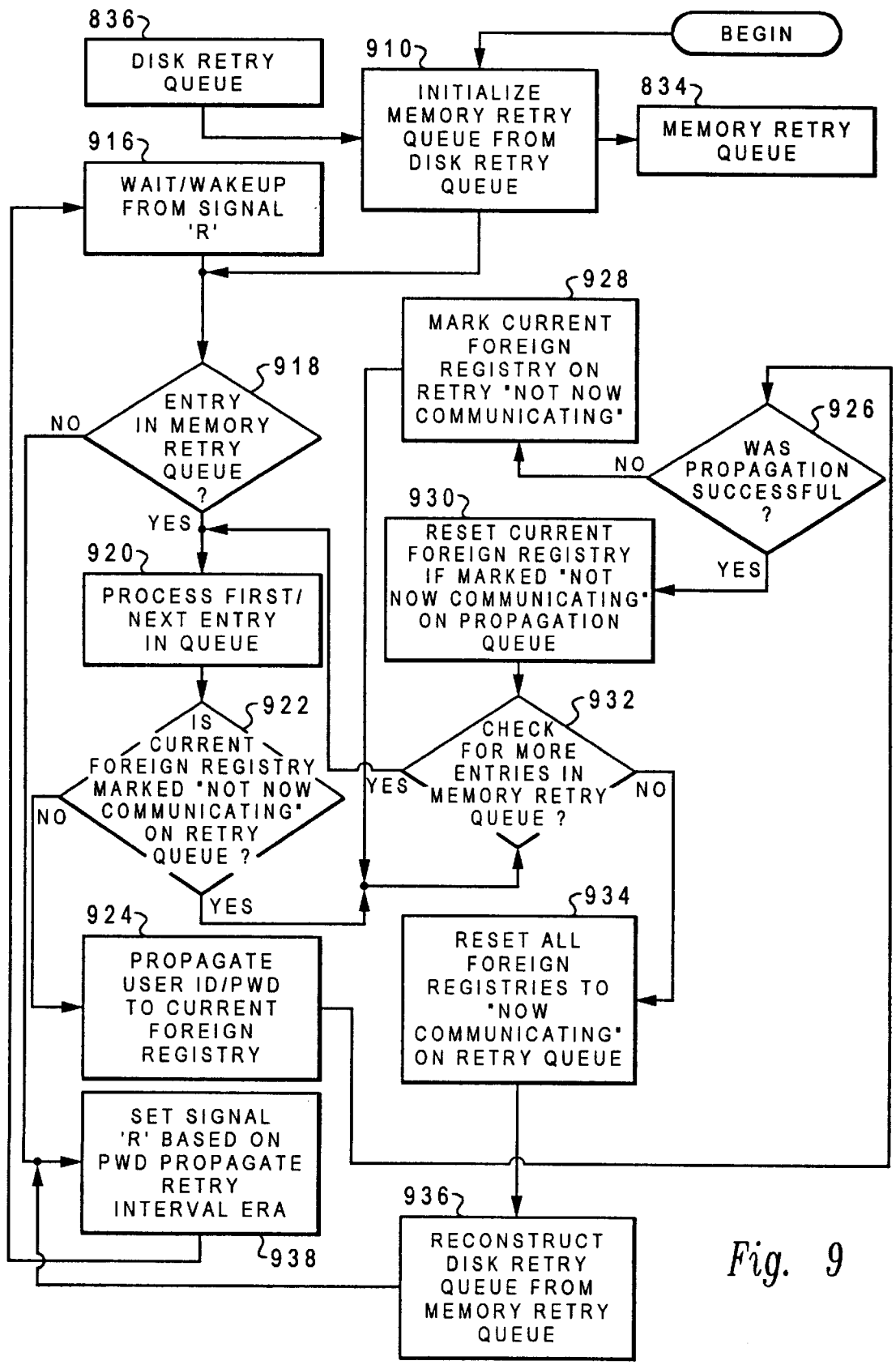
FIG. 9 depicts a flow chart of the password synchronization server retry queue thread according to the present invention.

All propagation retries are processed according to the method depicted in FIG. 9. FIG. 9 depicts a flow chart of the password synchronization server retry queue thread according to the present invention. First, in block 910, the password synchronization server initializes the memory retry queue from the disk retry queue at blocks 834 and 836, respectively. Next, the system proceeds to block 918 where the system determines if there are any entries in the memory retry queue 834 and if so, proceeds to block 920; otherwise, the system proceeds to block 938 described below.

In block 920, the system processes the first or next identified entry in queue 834 and then inspects this entry in block 922 to determine if this foreign registry marked as "NOT NOW COMMUNICATING ON THE RETRY QUEUE" If it is not so marked, the system proceeds to block 924; otherwise, if it is marked, the system proceeds to block 932 described below. In block 924, the system propagates the user ID/password to this selected foreign registry. Then, in block 926, the system determines if a successful propagation has occurred and if so proceeds to block 930 described below; otherwise, the system proceeds to block 928. In block 928, the system marks if this foreign registry on the retry queue as "NOT NOW COMMUNICATING?" and proceeds to block 932.

In block 930, this foreign registry's entry on the propagation queue (FIG. 8, 736) is inspected to see if it is marked as "NOT NOW COMMUNICATING." If so, it is reset; if not, it is left as is and processing proceeds to block 932.

In block 932, the synchronization server determines if any more entries are present in the memory entry queue 834 and if so, returns to block 920 described above and completes the sequence thereafter; otherwise, if there are no other entries in the memory entry queue 834, the system proceeds to block 934. In block 934, the system resets all foreign registries to "NOW COMMUNICATING" on the retry queue 834. Next, in block 936, the system reconstructs the disk retry queue from the memory retry queue 836 and 834, respectively. Then, in block 938, the system sets the signal "R" based on the password propagation retry interval ERA previously described. Once the signal has been sent to "R," the system then returns to block 916 for the next retry cycle.

PLAIN-TEXT PASSWORD PROTECTION

Operation of the password security synchronization (PWSYNC) 106 involves several RPCs that pass a plain-text password as a parameter. It is important that these passwords be protected when passed "over the wire," to prevent their exposure to unauthorized parties.

There are several scenarios to consider, involving whether one is running in a U.S.A. or international environment, or whether one is operating with compatible DCE servers or some other vendor's servers. Before thinking about such scenarios, it is helpful to understand the nature of the RPCs requiring protection, and the controls that affect the level of security used when issuing them. These "controls" are the DCE registry entities known as "binding authentication information" as stored in some ERA instances, and in one case stored as query trigger information directly within a schema entry. The level of protection used between any two programs that pass a plain-text password as a parameter is dictated by these controls, whose format follows this convention when using the dcecp program provided by OSF DCE 1.1. The well-known "pwd_mgmt_binding" era is used as an illustration here:

{pwd_mgmt_binding {{dce pwd_strength XXXXXXXX secret name}
/.:/subsys/dce/pwd_mgmt/pwd_strength}} where the "control" XXXXXXXX can be set to either "pktprivacy," "cdmf," or "pktinteg," according to whether the programs are on compatible platforms and whether the platforms support data privacy.

As can be seen, this ERA also contains other necessary information, such as the service principal name, the CDS namespace location where the service has exported its binding, and a specification to authenticate in the old Kerberos fashion, by "name."

Table 1 summarizes all of the information needed to understand how such controls are used, how they are set, and whether they address all situations involving client/server communication in the password synchronization environment.

There are seven distinct points where programs will issue an RPC that should be considered for over-the-wire protection of plain-text passwords. This design is concerned with six of them. (One point of not much concern is the initial user request to change a password via sec_rgy_acct_passwd, in which case DCE already prompts for a "caller key" to encrypt the password over the wire.) The chart identifies the pertinent information for each of these RPCs. The first three are part of a "push," the fourth one is part of a "pull," and the last two deal with the password generation capability.

TABLE 1

| SENDER | RECEIVER | RPC NAME | PROTECTION LEVEL CONTROLLED BY BINDING INFO STORED IN | ERA CREATED, PROTECT LVL SET BY | PROT. LVL UNIQ? |
|---|---|---|---|---|---|
| secd | pwsync | resc_pwd_mgmt_str_chk | PWD_MGMT_BINDING era of use principal | configuration "pw sync" option | NO |

TABLE 1-continued

| SENDER | RECEIVER | RPC NAME | PROTECTION LEVEL CONTROLLED BY BINDING INFO STORED IN | ERA CREATED, PROTECT LVL SET BY | PROT. LVL UNIQ? |
|---|---|---|---|---|---|
| pwsync | customer strength server | rsec_pwd_ mgmt_str _chk | SECONDARY_PWD_MGMT_ BINDING era of the strength server prin | configuration "strength" option | YES |
| pwsync | foreign registry | rsec_pwd_ propagate | FOREIGN_REGISTRY_PW_ PROP_BINDING era of the foreign registry principal | configuration "foreign registry" option | YES |
| foreign registry | pwsync | sec_attr_trig_ query via sec_rgy_attr_ look_by_* | query trigger info of PLAINTEXT_PASSWORD schema entry | configuration 'pwsync' option | NO |
| client machine | pwsync | sec_pwd_ mgmt_gen_ pwd | PWD_MGMT_BINDING era of user principal | rgy update tool: acct add/change | NO |
| pwsync | customer strength server | sec_pwd_ mgmt_gen_ pwd | SECONDARY_PWD_MGMT_ BINDING era on the strength server prin | configuration "strength" option | YES |

Protection levels for those ERAs that only attach to service principals are reasonably easy to administer because they only have to be specified once, during the installation of either pwsync, a strength server, or a foreign registry server. This is true whether the installation package is from the same or a different vendor. All of these installations involve the creation of service principals, and attachment of the ERA instance to those principals.

Other ERA values, however, specifically those that are attached to regular user principals, are administered with a little more difficulty because the contents of these ERAs are dependent upon information related to foreign registries and to password strength servers. Without the aid of an administrative tool, e.g., GUI, that "remembers" or has access to the pertinent information associated with these servers when they were installed, and that has "canned" information defining what ERAs need to be associated with these principals, administrators would be forced to create manually these ERA instances on newly created principals, which can be a cumbersome, error-prone task. The relevant ERAs include the well-known PWD_MGMT_BINDING, and the new "printstring" ERAs known as FOREIGN_REGISTRY and PASSWORD_STRENGTH.

The method by which foreign registries and customer strength servers shall communicate such information to administrative tools is to attach the information onto the pwsync principal itself. These customer or vendor-written administrative tools, which use well-known OSF DCE functions to accomplish their tasks, can simply read the ERA information attached to "pwsync" principal, allowing it to display the information for administrative selection whenever a new user principal is being defined.

The "PROT LVL UNIQ?" column of the chart indicates whether the particular protection level is assigned to a single "client/server" pair, or whether it can be shared between multiple pairs. For example, the second and third items have unique and unambiguous protection level controls because there is a separate ERA instance for each and every foreign registry or password strength server communicated with by pwsync. Thus, if some foreign registries require different protection levels, these would be accommodated because there are separate ERAs to reflect those differences, specified during the installation of each foreign registry.

A value of "no" in this column indicates that a specified protection level is not unique across all client/server combinations. For example, item 4 has the problem that all "pulls" from foreign registries are subject to the authentication information stored in one single query trigger item. There is only one definition of a schema, so the PLAINTEXT_PASSWORD definition applies to all foreign registries, precluding the ability for these registries to use different protection levels.

Another example is the combination of items 1 and 5, where the same ERA attached to a user principal serves to denote the protection level between two distinctly different operations. This precludes the ability to select a different protection level to be used between pwsync and secd on a strength API, and between pwsync and a client machine for a password generation API request.

For the above "no" cases, foreign registries and clients from different vendors are typically required to live with the "lowest common denominator," which may result in the absence of plain-text password protection for these cases. For these same cases where foreign registries and clients from the same or a compatible vendor are involved, modifications to two APIs are be made to take advantage of the maximum degree of protection afforded by a particular client/server pair:

1) The sec_rgy_attr_lookup_* APIs modified to recognize the "PLAINTEXT_PASSWORD" ERA name as a special case. The "authentication information" portion of the query trigger will be discarded, keeping the principal and CDS information necessary to communicate with pwsync. The proper authentication information is obtained by issuing a callback to secd to query the value of FOREIGN_REGISTRY_PW_ PROP_BINDING for this particular foreign registry. This authentication data is unique per foreign registry, as opposed to the auth data stored in the query trigger. It includes the protect level to be used in protecting data "on the wire."

Other ERAs having defined query triggers are not affected by this change. They continue to use all of the information supplied in the query trigger, including parameters controlling the various authentication levels.

DCE foreign registries from differing, incompatible vendors, on the other hand, are all forced to use the same protect level, that which is defined in the query trigger. This must be the "lowest common denominator;" i.e., if one incompatible foreign registry can only support packet integrity, then all incompatible foreign registries must operate under that constraint.

2) The appropriate value for the protect level stored in any given user's PWD_MGMT_BINDING shall be considered to be the maximum level allowed between secd and pwsync when issuing the strength API. However, this may be too high for use between a normal client and pwsync on a "generate password" request. Hence, the IBM version of sec_pwd_mgmt_gen_pwd institutes "application retry logic." If the initial value fails because of the inability to support "pktprivacy," the client logic will retry using "cdmf." If that fails, it will use "pktinteg." While this scheme is effective for IBM DCE clients, it may not be implemented in non-IBM DCE clients, as the CDMF algorithm is presently not exportable to foreign countries by any company other than IBM.

In the situation where a non-compatible DCE client machine is incapable of supporting the protection level specified in PWD_MGMT_BINDING, any attempt by this client to request "password generation" will fail. Options available to the administrator to rectify this situation include eliminating the requirement that a given principal who wishes to change his password from this machine be provided with a password synchronization server-generated password, or, downgrade the protection level specified in PWD_MGMT_BINDING for this principal to "packet integrity." The latter option preserves desired functionality at the expense of exposing the plain-text password "over the wire" for this principal.

Schema definitions for the new ERAs are required for this password synchronization implementation. The value of the "reserved" flag is set TRUE for all of these ERAs, since once pwsync has been installed, "accidental" erasure of schema definitions should be avoided. Administrators can set the reserved flag to FALSE and then delete the schema definitions if they so desire.

There is only one new RPC, in support of the "push" protocol:

---

FUNCTION PROTOTYPE:
   void rsec_pwd_propagate (
      [in] handle_t h,
      [in] sec_rgy_name_t principal,
      [in] char * password,
      [in] sec_timeval_sec_t pwd_change_time,
      [out] error_status_t * status
   );

---

The RPC propagates passwords to foreign registries. All foreign registries must reside in the same cell as the password synchronization server. The username and time of DCE registry update are also provided. If the foreign registry wishes to discard the information and not be informed of the very same password change event in a later propagation cycle, it should return successful status. If for any reason it cannot handle the notification at the present time, but would like for the password sync server to send the event in a later propagation cycle, then an unsuccessful status, of any kind, should be returned.

Except in the case of access to the "password pull" database, all contention for internal resources is always "mutually exclusive." There is no advantage in taking on the extra overhead of locking macros for such cases. Hence, direct calls to DCE pthread's "mutex" APIs are used when resources cannot withstand shared access of any kind. In essence, then, mutex acquisition is equivalent to obtaining a "write lock," with the mutex holder blocking all others trying to obtain the mutex; except that the added overhead of locking logic on top of the mutex calls is avoided. "Mutex" is an OSF DCE pthread component that is equivalent to a "lock" and is well know to those skilled in the art.

In the case of the password pull database, the server takes on the added overhead of locking macros and software, patterned after the DCE security server (secd) and adapted for the password synchronization server's use. Use of the locking paradigm is deemed necessary so that when the pull database is periodically pruned of excess entries and sorted, requests to "pull" a password are not blocked; yet requests to change a password in the pull database are blocked. This cannot be easily accomplished by direct calls to pthread mutex routines. In fact, that is what the secd locking interfaces were designed to do: to provide a slightly more complicated interface to the calling threads; have that interface maintain state information as to what type of lock is currently held, and by how many threads; and to use that information to determine if pthread's mutex library should be invoked to truly block any calling threads.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media, such as a network, and telephone networks, via modem. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method of managing passwords in a network including a plurality of clients, a main data store, and a remote registry, said method comprising:

maintaining password synchronization between passwords stored in said main data store and passwords stored within said remote registry; and checking password integrity among said plurality of clients utilizing a password strength server so that each client maintains a password having a composition consistent with a format specified by a network server of said network.

2. The method of claim 1, and further comprising:

providing an information account for each of said plurality of clients that includes a user's password.

3. The method of claim 2, and further comprising:

propagating a clear-text password to each of said plurality of secondary data stores.

4. The method of claim 3, and further comprising:

encrypting said clear-text password; and storing said encrypted clear-text password in said information account.

5. The method of claim 1, and further comprising:

binding each of said plurality of password strength servers with at least one of said plurality of clients.

6. The method of claim 1, and wherein said password checking step further comprises:

modifying a set of password composition rules utilized by said set of clients to perform password composition checking.

7. A computer program product that provides password composition checking for a plurality of clients in a network having a main data store and a remote registry, said computer program product comprising:

computer usable code means for selecting a password by a user associated with a particular client among said plurality of clients;

a security server coupled to said main data store and said plurality of clients;

a password synchronization server that maintains password synchronization between a copy of said password stored in said main data store and a copy of said password stored in said remote registry; and a password strength server associated with said particular client that checks the integrity of said selected password so that said particular client maintains a password having a composition consistent with a format specified by a network server of said network.

8. The computer program product of claim 7, and further comprising:

computer usable code means for providing an information account for each of said plurality of clients, said information account including a user's password.

9. The computer program product of claim 8, and further comprising:

computer usable code means for routing a clear-text password to said password strength server.

10. The computer program product of claim 9, and further comprising:

computer usable code means for encrypting said clear-text password for storage in said information account.

11. The computer program product of claim 7, and further comprising:

computer usable code means for binding said password strength server with at least one of said plurality of clients.

12. The computer program product of claim 7, wherein said password strength server is one of a plurality of password strength servers, each of said plurality of password strength servers being associated with a respective one of said plurality of clients and being uniquely programmable with respect to performing password composition checking.

13. A network server that provides password composition checking for a plurality of clients in a network having a main data store and a remote registry, said network server comprising:

a security server coupled to said main data store and said plurality of clients;

a password synchronization server coupled to said security server that maintains password synchronization between passwords stored in said main data store and passwords stored within said remote registry; and a plurality of password strength servers coupled to said password synchronization server, wherein said plurality of password strength servers ensure that each of said plurality of clients maintains a password having a composition consistent with a format specified by said network server.

14. The network server of claim 13, and further comprising said main data store, wherein said main data store includes an information account for each of said plurality of clients that includes a user's password.

15. The network server of claim 14, wherein said security server provides a clear-text password to said password synchronization server for subsequent routing to at least one of said plurality of password strength servers.

16. The network server of claim 15, wherein said security server includes means for encrypting said clear-text password for storage in said information account.

17. The network server of claim 13, and further comprising said main data store, wherein said main data store includes an information account for each of said plurality of password strength servers that binds each of said plurality of password strength servers with at least one of said plurality of clients.

18. The network server of claim 13, wherein each of said password strength servers is uniquely programmable with respect to performing password composition checking.

* * * * *